Nov. 16, 1965  J. BALTHES  3,217,823
AGRICULTURAL MACHINE FOR CARRYING WORKERS
Filed April 29, 1963  5 Sheets-Sheet 1

INVENTOR.
JOHN BALTHES.
BY D. S. Johnson
ATTORNEY

INVENTOR.
JOHN BALTHES.
BY
D.S. Johnson
ATTORNEY

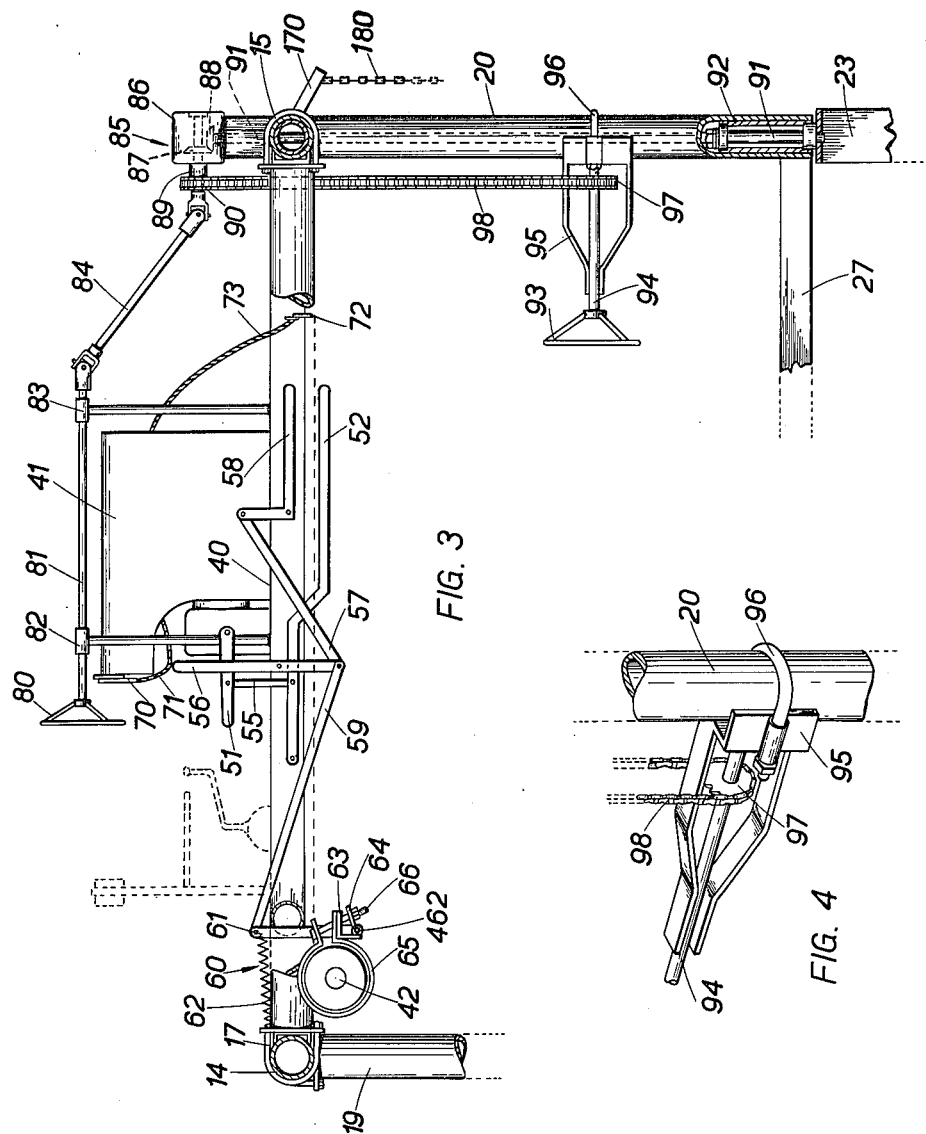

Nov. 16, 1965 J. BALTHES 3,217,823
AGRICULTURAL MACHINE FOR CARRYING WORKERS
Filed April 29, 1963 5 Sheets-Sheet 4
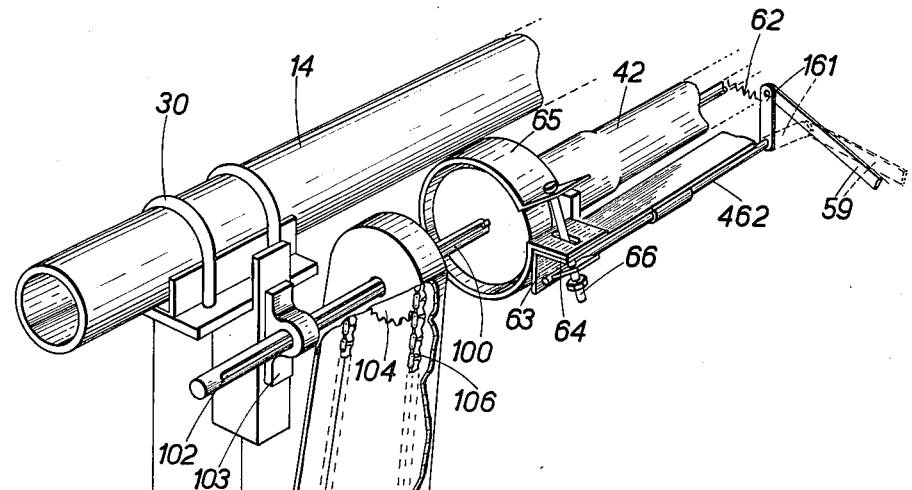
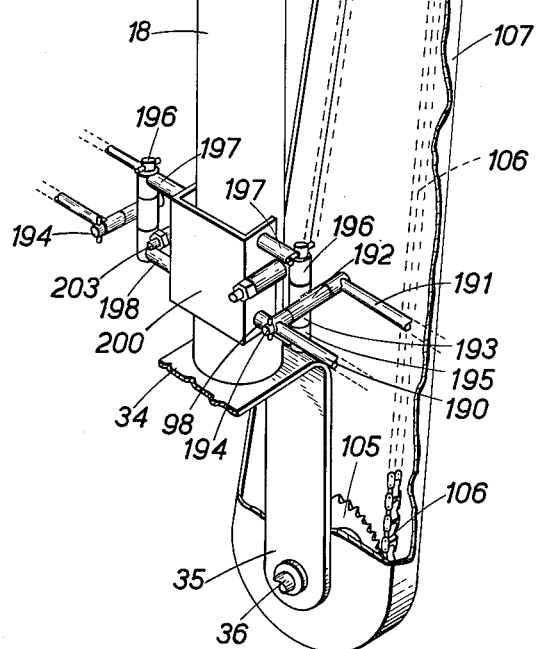
FIG. 5
INVENTOR.
JOHN BALTHES.
BY
D.S. Johnson
ATTORNEY INVENTOR.
JOHN BALTHES.
BY
D. S. Johnson
ATTORNEY

United States Patent Office 3,217,823
Patented Nov. 16, 1965

3,217,823
AGRICULTURAL MACHINE FOR CARRYING
WORKERS
John Balthes, Port Burwell, Ontario, Canada, assignor to
Balthes Farm Equipment Manufacturing Limited, Port
Burwell, Ontario, Canada
Filed Apr. 29, 1963, Ser. No. 276,403
7 Claims. (Cl. 180—27)

This invention relates to tobacco harvesters and, more particularly, to such machines as may be employed for a variety of duties in tobacco farming such as transplanting, cultivating, spraying or dusting, and, of course, the harvesting.

The tobacco farmer, as with any farmer, is required to produce a product which is clean and of good quality. Present harvesting methods are beset with difficulties and in many instances contribute in large measure to a low quality crop. It has been a standard practice on many farms to employ horses or mules and these animals move through the rows destroying or bruising a large quantity of the crop. Picking methods also contribute to a low quality product; manual methods require pickers to move down the rows picking off the leaves until they have as many as they can carry and then taking their bundle to the tobacco bins being pulled by the horses. The bundling of the leaves bruises them and the movement of the pickers through the rows leads to bruising.

These methods are also inconvenient and expensive. The seasonal labour employed is transient and not always available. The crop may ripen prematurely or late and in such an event has to be picked quickly to limit spoilage. The work is arduous and the supply of labour is consequently diminishing.

Various forms of equipment have been devised to overcome the above shortcomings but these have met with limited acceptance. The methods of cultivating tobacco vary greatly: the distance between rows of plants varies; the sequence of maturing of the leaves varies; the size of the farms varies; and the size of the individual fields varies. These factors, of course, influence the economy of the farm and the feasibility of employing machinery.

It is the main object of this present invention to provide an improved tobacco harvester.

It is another object of this present invention to provide an improved tobacco harvester which may be employed for transplanting, cultivating and spraying or dusting as well as harvesting.

It is another object of this present invention to provide an improved tobacco harvester which may be employed in harvesting tobacco sown in rows of widely varying widths.

It is another object of this invention to provide a tobacco harvester which may be driven from one of a plurality of positions so that the operator will have improved control irrespective of the operation being carried out.

It is a further object of this invention to provide an improved tobacco boat structure which may be manufactured economically and minimizes the damage to the crop.

In accordance with the present invention, the inventor provides a tobacco harvester which has a frame elevated at some distance above the ground upon which frame a motor is mounted and the frame control position is provided. The frame is supported in its elevated position by a pair of rear vertical members at the lower end of which wheels are mounted which wheels are driven by a motor. The front end of the elevated frame is supported on a medial vertically extending member which also has a wheel mounted adjacent its lower end which further supports a second control position so that the vehicle may be controlled from either the upper first position of the lower second position depending upon the function to be carried out. On the forward end of the frame a pair of tobacco bin supporting members may be secured to laterally extending members which are in turn secured to the frame. This feature permits the forward end of the tobacco bins to be supported at various distances from the medial line of the vehicle. The rear end of the tobacco bin is supported by an arrangement secured to the rear vertical members which may also be moved laterally to accommodate the varying widths of rows. The rear wheels are driven by means of a motor and a transmission system and when the rear vertical members are moved laterally, with respect to the medial line, the transmission is adapted to accommodate this movement.

Another feature of this present invention resides in an improved tobacco bin structure. In this present invention, the structure provided comprises a general rectangular frame structure which is provided at its rear with a transverse member which is freely slidable and may be pushed downward out of the way of the picker for packing the bins and when the bins are filled slides vertically to provide a handle at the rear end.

These features and objects, together with other features and objects, will become more apparent from the following description and drawings in which:

FIGURE 3 is a partial fragmentary side view of the embodiment illustrated in FIGURE 1 and serves to illustrate the control system;

FIGURE 4 is an enlarged partial view illustrating the arrangement for mounting a lower steering system in accordance with the present invention;

FIGURE 5 is an enlarged partial fragmentary view of the final driving mechanism in accordance with the present invention;

Figure 1:
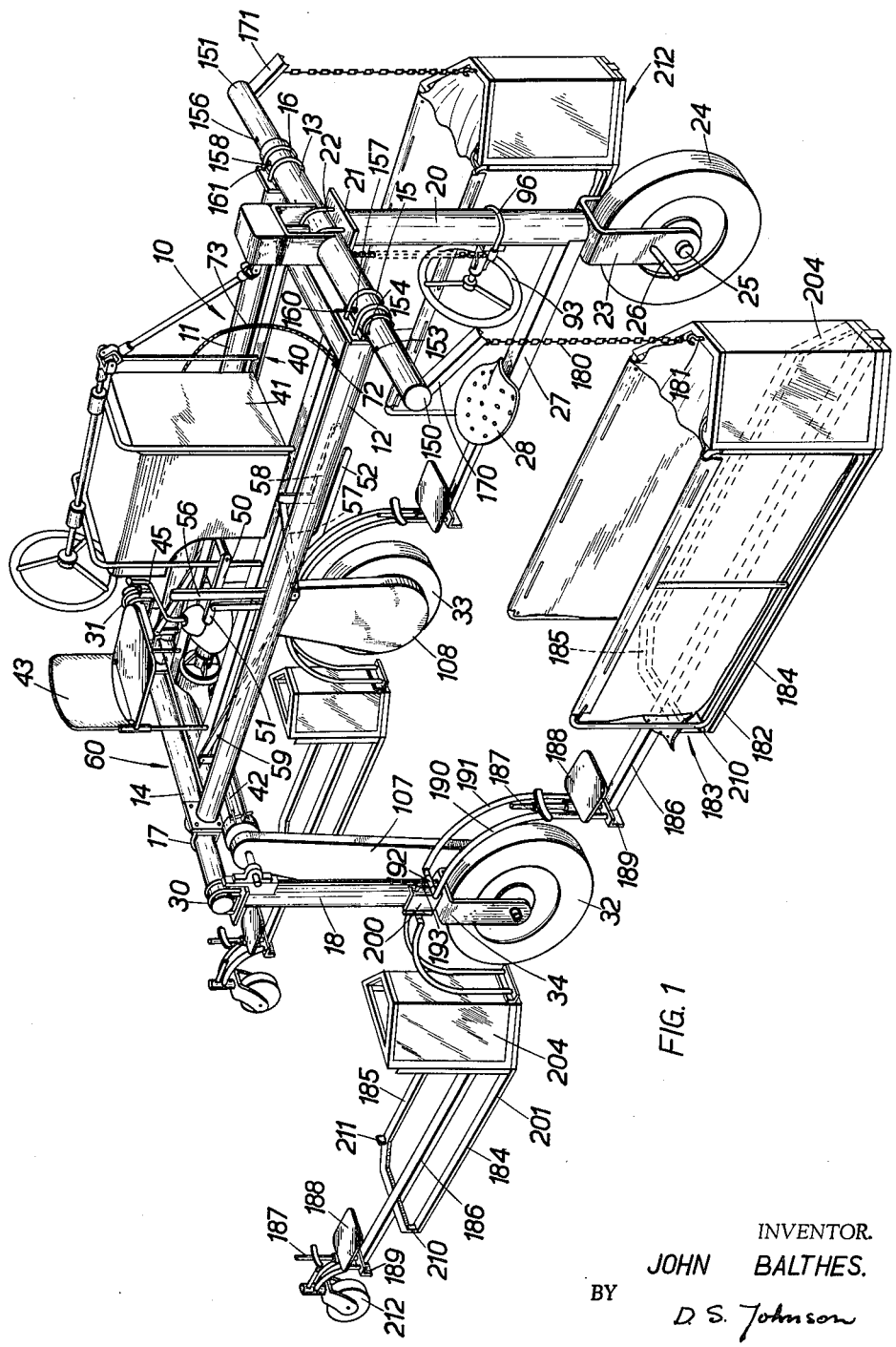
FIGURE 1 is a general perspective view of one embodiment of the invention as used as a tobacco harvester.

Referring now to the drawings, FIGURE 1 illustrates a view of the preferred embodiment in accordance with the invention. It will be observed a tobacco harvester in accordance with the invention comprises a frame generally indicated at 10, this frame comprises a pair of side members 11 and 12 respectively, which are secured in a spaced apart relationship at the forward end by a primary transverse member 13 and the rear end to a transverse member 14. It is to be noted that at the forward end members 11 and 12 are secured to member 13 by means of a series of U-bolts such as 15 and 16 and to the rear transverse member 14 in a similar fashion by U-bolts such as illustrated at 17.

Frame 10 is suspended at its rear end by a pair of vertical legs, only one of which is illustrated at 18 and the other which is illustrated at 19 in FIGURE 3. At the forward end a medially disposed vertical tubular member 20 is secured to the transverse member 13 by plates 21 and a series of U-bolts 22 to hold the members 13 and 20 in a secure relationship. At the lower end of vertical member 20 a yoke 23 is mounted and between the arms of yoke 23 a forward wheel 24 is rotatably secured to axle 25. For convenience, a pair of footrests, one of which is illustrated at 26 extend laterally from either side of yoke 23. The relationship between member 20 and yoke 23 will be more fully described later in this description.

Immediately above the junction of yoke 23 and member 20 a rearwardly extending bar 27 is immovably secured and upon the rear end of bar 27 an operator's seat 28 is mounted. This constitutes a lower operating position.

Rear vertical members such as 18 and 19 are secured at their top end to transverse member 14 by U-bolts such as 30 and 31. Adjacent the lower end of rear vertical members 18 and 19 wheels such as 32 and 33 are mounted. As will be seen with reference to FIGURE 5 on the lower end of member 18, a yoke 34 is secured and between the arms of this yoke an axle 36 is rotatably mounted and on this axle a wheel such as 32 is conventionally secured.

It will, of course, be understood that members 18, 19 and 20 are of such height that the transverse members 13 and 14 will be supported above the ground at a height such that they will clear adjacent rows of tobacco leaves.

Upon frame 10, an open platform 12 is mounted and upon this platform a motor 41 is secured. Motor 41 is connected by standard automotive drive to an automotive axle 42 mounted at the rear of the frame. Rearward of motor 41 a second operator's seat 43, a second operative position, is mounted. The drive from motor 41 is controlled by a conventional gear box adapted to be actuated by lever 45. A clutch, not visible, is adapted to be actuated by lever system 50 which is provided with a handle 51 to enable operation from the upper position and a lever 52 to facilitate operation from the lower operator's position. These two levers, 51 and 52, are linked as illustrated in FIGURE 3 by rod 55, and are in turn operatively connected to control the action of the clutch.

A brake lever 56 is operable from the upper position and is linked by means of rod 57 to a brake lever 58 operable from the lower position. Lever 56 is also linked to a braking mechanism by means of a further rod 59 in the manner shown. The brake mechanism is generally indicated at 60 and comprises a vertically extending lever 61 which is secured at its top end to connecting rod 59. This lever is normally biased to the upright position by a spring 62 connected from adjacent its top end to transverse member 14 or a suitable fixed member. The lower end of lever 61 is connected to a horizontally extending rod 462 which is in turn secured at its outer end to an angle 63. Leg 64 of angle 63 is connected to a brake band 65 which surrounds axle 42 adjacent the outer end thereof. Brake band 65 shown by the drawings has a split ring configuration, the ends of which are adjustably connected by means of a threaded rod and bolt 66. This permits adjustment of the brakes.

When the lever 56 is pulled back towards the operator, connecting rod 59 will pull lever 61 forward causing it to pivot about rod 462 and the brake will be tightened and limit the rotary movement of the rear axle. It will, of course, be understood that a similar system is provided on the far side, which system may be connected to brake lever 56 in a similar manner.

The actuation of lever 58 by pulling down thereon, will, of course, cause connecting rod 57 to pull the lower end of lever 56 forward and the brakes can accordingly be actuated from the lower operating position, that is, when the operator is sitting in seat 28. Clutch lever 51, as mentioned previously, is tied through rod 55 to clutch lever 52, and these two levers will act in concert so that the same control may be effected from either of the two operative positions.

Engine 41 is controlled by a throttle lever control 70 which is connected through wire 71 to the carburetor and similarly, the lower throttle control lever 72 is connected through wire 73 to the carburetor of the engine to enable the operator to operate the motor from either the lower or upper position.

As illustrated in the drawings, a harvester in accordance with the present invention is provided with two steering systems, an upper system and a lower system. The upper system comprises steering wheel 80 which is mounted upon a steering rod 81 which is secured in a conventional manner above the motor by frames 82 and 83. Rod 81 is connected by means of linking rod 84 in the manner shown through a shaft 89 to a gear system 85 mounted in housing 86. Gear system 85 comprises a pair of bevelled gears 87 and 88. Gear 87 is mounted upon shaft 89, upon which a sprocket 90 is also mounted.

Shaft 89 is rotatably secured in any conventional manner within housing 86. Gear 88 is mounted upon the end of a drive rod 91 which passes down through the vertical member 20. At its lower end rod 91 is connected by means of a bearing tube and a conventional arrangement of bearings illustrated generally at 92 to yoke 23. At a convenient height on vertical member 20, a second steering wheel 93 is secured. Steering wheel 93 is supported on steering rod 94 which is, in turn, rotatably mounted on a bracket 95. Bracket 95 is adjustably secured to vertical member 20 by a U bolt such as 96. On steering rod 94, a sprocket 97 is mounted and this sprocket is connected by means of a chain 98 to sprocket 90 in shaft 89. By this arrangement, the vehicle may be steered either from the upper or lower positions by steering wheels 80 or 93 respectively, and turning of either wheel will change the direction of movement of the lower wheel 24.

From either end of axle 42, driving rods 100 and 101 extend. Each is provided with a keyway such as 102 on rod 100. These rods are supported at the outer end by a bracket such as 103 on vertical member 18 and intermediate bracket 103 and the adjacent end face of axle 42, sprockets such as 104 are mounted. On the inner end of axle 36 a driven sprocket 105 is mounted and this sprocket is connected to sprocket 104 by a chain such as 106. For safety, a chain guard 107 is secured about the sprocket and chain system described before. Rear wheel 33 on the other side of the vehicle is similarly connected by a chain drive to axle 42 and the chain guard for this system is indicated in FIGURE 1 by the numeral 108. Sprocket 104 may be moved along the rod 100 depending upon the width of the track desired, and similarly, the relationship between vertical member 18 and transverse member 14 may be altered by loosening the U-bolts such as 30 and moving them out the required distance. It will, of course, be understood that the sprockets 104 will also be moved out corresponding distance and secured in the desired position. The arrangement on the other side of the vehicle is, of course, the same so that the vertical member 19 there may be moved out by loosening and resecuring the U-bolt 31 and the chain drive will be correspondingly moved outwards.

At the forward end of the vehicle, through transverse member 13, a pair of booms or secondary members 150 and 151 are secured to extend laterally on either side. Members 150 and 151 are adapted to telescopically slide within the member 113 and are provided with holes therein such as 153, 154 and 156, which may be aligned with corresponding holes such as 157 and 158 on member 13, and through which pins such as 160 and 161 may be passed to hold such boom in fixed engagement. By the above arrangement, the booms may be projected for varying distances, depending on the widths of the rows and then firmly secured in position. From booms 150 and 151, forwardly and downwardly extending arms such as 170 and 171 extend.

From the lower end of arm 170, a chain 180 is secured and the lower end of chain 180 engages a hook 181 at the forward end of a tobacco bin carrier 182. Tobacco bin carrier 182 comprises an open platform 183 having side members 184 and 185 secured in a spaced apart relationship from a central member 186. Central member 186 has a length exceeding that of side members 184 and 185 and at the rear end thereof a seat supporting post 187 is mounted. Upon this post, a seat 188 is adjustably secured. Also at the rear end of member 186 an angle 189 is secured and from angle 189 a pair of spaced apart arcuate rods 190 and 191 extend upwardly and rearwardly. These rods are secured at their upper extremities by a transverse bar 192 which is, in turn, secured to a vertical tubular member 193. Transverse member 192 is secured to members 190 and 191 by a horizontal pin 194 and vertical tubular member 193 interfits between vertical tubular members 196 and 195. Members or pins 197 and 198 secure these members to mounting bracket 200. By means of correspondingly numbered sections, the forward end of a trailing tobacco bin carrier 201 is secured to the vertical member 18 to trail therebehind. Bracket 200 is secured to vertical member 18 by means of a U-bolt 203.

On the forward end of tobacco bin carrier 182, a protective wall 204 is secured. As will be seen from the drawings, this wall is of generally triangular form and serves to reflect any leaves which may come in contact therewith and thus reduce bruising thereof. To locate the tobacco bin upon carrier 182, a pair of stops such as 210 and 211 are provided on side frame members 184 and 185 respectively, and a pair of angles 484 and 485 serve to prevent lateral movement of the bins. On the other side of the vehicle, a corresponding tobacco bin structure 212 of the same structure is mounted in the same manner.

As mentioned previously, to the rear surface of vertical member 18, a trailing tobacco bin carrier 201 is secured at its forward end in a similar manner as tobacco bin carrier 182 is secured at its rearward end. These bin and ring attachments make for easy adjustment and dismantling, and permit the carriers to be removed at will with little difficulty.

Tobacco bin carrier 201 is of substantially the same structure as bin carrier 182, except that at the rear end thereof wheel 212 is provided. This wheel is supported by an axle 214 which is in turn supported by a yoke 215 from the upper surface of which a tubular rod 216 extends. Securely fixed to the top of rod 216 is a guiding rod 217 and from adjacent the top of rod 216 a pair of arcuate rods 218 and 219 extend to be secured to an angle 189 corresponding to angle 189 of the tobacco bin carrier 182. For convenience, the remaining members of tobacco bin carrier 201 are characterized by similar numbers as identify the various components of tobacco bin carrier 182.

Figure 6:
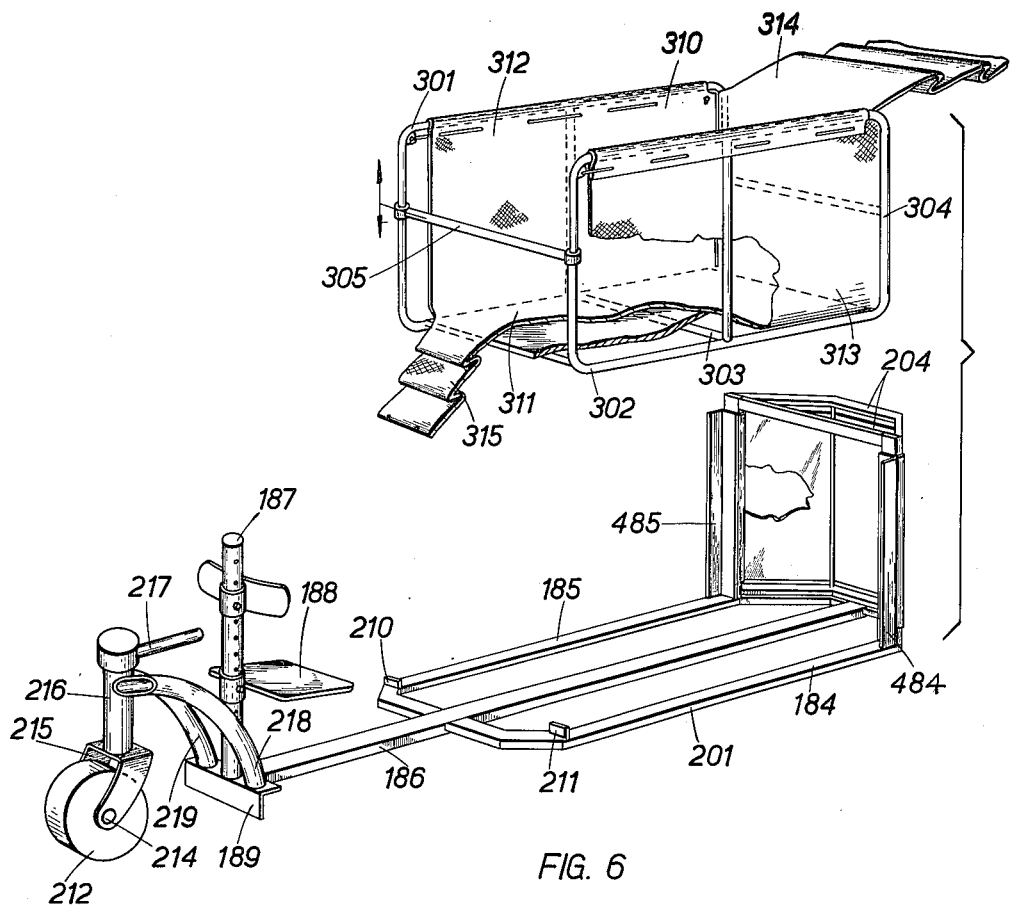
FIGURE 6 is a general perspective view of a rear tobacco bin carrier in accordance with the present invention and a tobacco bin in accordance with the present invention is illustrated in exploded relationship therewith.

The tobacco bins themselves are characterized by the structure illustrated in FIGURE 6. As illustrated in this drawing, they comprise a pair of spaced tubular frames 301 and 302 which are held in spaced apart relationship by transverse rods such as 303 on the bottom thereof and 304 on what may be termed the forward end.

At the rear, a transverse rod 305 is slidably connected between frames 301 and 302 so that it may be slid up or down for the convenience of the picker. For example, when the tobacco bin is in situ as illustrated in FIGURE 1, rod 305 will normally be pushed downward to its bottom limit of travel so that the picker will have substantially unrestricted access to the tobacco bin and be able to stack the tobacco therein as prescribed. When the bin is full, he will then be able to slide rod 305 upwards and this rod 305 will serve as a handle.

Within the framework of the tobacco bin, a canvas container 310 is placed and secured by means of cords and eyelets about the upper members of frames 301 and 302. Canvas container 310 comprises a bottom wall 311, side walls 312 and 313, a front and top wall 314, which is formed integrally with the bottom wall 311, and a rear wall 315. There is no connection between the side walls and the front and top wall 314, nor between the rear wall 315 and the side walls 312 and 313, except through bottom wall 311. This arrangement permits the circulation of air through the packed container.

Throughout this description, it will be noticed that the various members are secured together by U-bolts. This form of joint permits the structure to be easily dismantled and assembled for shipping and for transportation from one location to another. It also gives the structure flexibility and permits the machine to accommodate various widths of row.

Prior to operation, the structure is assembled in a manner which will be evident from the foregoing description of the structure. The drive is adjusted so that the rows of the tobacco plants will pass on either side of the single front wheel between the rear wheels. The laterally extending booms 150 and 151 on forward transverse member 13 are secured in the required position by means of the aligned holes by aligning the corresponding holes and inserting the pins such as 160 and 161. The tobacco bin carriers such as 182 and 201 are suspended or supported by means of the chains 180 from forward arms 170 and 171 and secured to the rear vertical members such as 18 and 19 by brackets similar as through pins 194 and 197. Bracket 200 is, of course, previously secured to vertical member 18 by means of the U-bolt 203.

Figure 2:
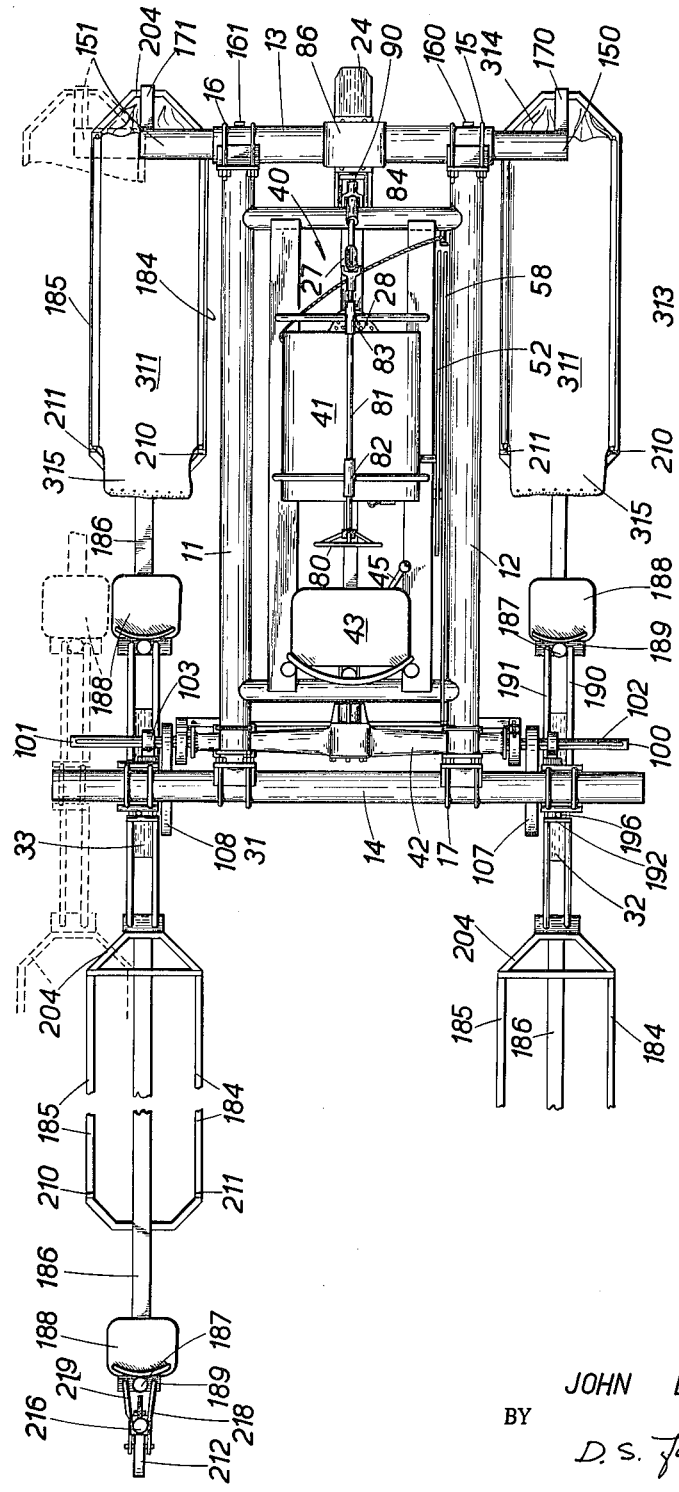
FIGURE 2 is a plan view of the embodiment illustrated in FIGURE 1 and serves to illustrate the adaptability of this present invention to various widths of rows.

The corresponding tobacco bin carrier on the far side of the vehicle is similarly secured and the trailing tobacco bin carriers such as 201 are secured to members 18 and 19 correspondingly by the rear pins 194 and 196. In FIGURE 2, the plan view of the arrangement shown in FIGURE 1, an alternative position for the tobacco boat carriers is shown in dotted line and serves to illustrate the adjustability of the present structure. The tobacco bins are then mounted on their respective carriers. When the clutch has been disengaged by actuation of levers 51 or 52 and the brake has been engaged by actuation of lever 56 or lever 58, the motor 41 is started and the desired gear engaged. As the machine progresses down through the rows, the operator picks off the mature leaves and places them in the tobacco bin. When the bin is filled, the cover flap 314 and the rear flap 315 are brought over the exposed leaves and secured; by means of handle 305 and the transverse bar 304 the entire bin may be transported to the curing sheds. It will, of course, be understood that during the picking process the sliding handle 305 will be depressed so that the operator may have easy access to the interior of the bin and there will be no interference with this movement by this bar. It will be seen that by this arrangement the movement throught the crop is minimized, the crop is conveniently handled by less labour and in a shorter period. The damage is consequently minimized and the quality improved by the reduced traffic and handling. The easy dismantling and assembly of the vehicle permit the vehicle to be easily transported and lends to use by cooperatives where various row widths are employed.

For spraying, the tobacco bins and carriers will, of course, be removed and a suitable spray tank mounted on the underside of the platform 11, and the necessary spray arms may be supported from the rear transverse member 14. It will, of course, be understood that the spray tank will be provided with a suitable pump, if necessary, and suitable connections to the spray arms.

While the above invention is being described with specific reference to a particular embodiment, it will be understood that other variations and modifications may be made thereto without departing from the spirit and scope of the invention as defined by the appended claims.

I claim:
1. An agricultural machine comprising a frame, a platform supported by said frame, a pair of traction wheels mounted adjacent the rear end of said frame, motor means supported by said platform, drive means for transmitting power to said traction wheels from said motor means, a steerable wheel mounted adjacent the forward end of said frame for pivotal movement about a substantially vertical axis, a first control system mounted adjacent the rear of said frame and thereupon in an upper position, said first control system being operably connected to said steerable wheel to control the direction of movement of said machine, a second control system mounted forward of said first control system and in a lower position relative thereto to control the direction of movement of said vehicle, and first and second control systems being connected one to the other, said frame comprising spaced apart forward and rear members, a pair of substantially vertically extending members adapted to support said rear member a predetermined distance from the ground, wheel mounting elements secured adjacent the bottom of said vertical members, said traction wheels being mounted on said elements, said vertically extending members each being adapted to be moved laterally with respect to a medial line of the machine to provide a track of variable width, said drive means including an axle and power transfer means connecting said axle and said traction wheels, said power transfer means including a pair of driving rods, one extending laterally at each end of said axle and a driving sprocket adjustably secured on each of said rods, a driven sprocket connected to each wheel and chain means connecting said driving and driven sprockets.

2. A machine as claimed in claim 1 including hitch means mounted on the respective rear vertical members for supporting the rear end of a respective tobacco bin carrier.

3. A machine as claimed in claim 2 including a pair of additional tobacco carriers positioned rearwardly of said first-mentioned tobacco bin carriers, each adapted to be supported on either side of said machine, said rear bin carriers each comprising, a longitudinally extending main member, a pair of side members secured to said main member in a spaced apart relationship to form therewith a tobacco bin supporting platform, a vertically extending deflecting surface mounted adjacent the forward end of said last-mentioned platform, an operator's seat mounted adjacent the rear end of said main member, and a free wheel carried by said main member to engage the ground rearward thereof, said free wheel being adapted to be steered by an operator from said seat supported on the rear end of said last-mentioned platform.

4. An agricultural machine as claimed in claim 1 in which said frame includes a pair of secondary members adapted to be secured to said forward member to project laterally therefrom on either side for variable predetermined distances, and means on each of said secondary members for supporting the forward end of a respective tobacco bin carrier.

5. A machine as claimed in claim 4, said carriers each being suspended at their front ends from their respective secondary members and at their rear end from their respective rear vertical members, said tobacco bin carriers each comprising a main member and a pair of spaced apart side members adapted to support a tobacco bin, a deflecting surface mounted adjacent the forward end of said main member and an operator's seat mounted adjacent the rear end of said main member.

6. A machine as claimed in claim 1 including tobacco bin carrier supporting means on said rear vertical members adapted to support the forward end of respective trailing tobacco bin carriers.

7. A machine as claimed in claim 1 including a brake mechanism, said mechanism including a band surrounding said axle and means adapted to bring said band into engagement with said axle to stop rotation thereof, said means including a first lever operable from said first upper rear control position, and a second lever operable in concert with said first lever and from a second lower forward control position below said frame.

References Cited by the Examiner

UNITED STATES PATENTS

| 1,274,978 | 8/1918 | Bishop | 74—494 |
|---|---|---|---|
| 1,275,781 | 8/1918 | Stark | 214—83.1 |
| 1,492,453 | 4/1924 | Haines | 150—51 |
| 1,642,643 | 9/1927 | Carruth | 150—51 |
| 2,228,454 | 1/1941 | Hamilton | 180—72 X |
| 2,504,403 | 4/1950 | Finley | 280—32.5 X |
| 2,511,940 | 6/1950 | Platt et al. | 180—27 |
| 2,518,965 | 8/1950 | Whitley | 280—32.5 X |
| 2,619,361 | 11/1952 | Connors | 180—1.5 X |
| 2,624,478 | 1/1953 | Kaplan | 180—7 |
| 2,701,022 | 2/1955 | Chesnutt | 280—32.5 X |
| 2,785,762 | 3/1957 | Gahler | 180—27 |
| 2,788,141 | 4/1957 | Hendrix | 280—32.5 X |
| 2,836,112 | 5/1958 | Griffin | 280—32.5 X |
| 2,933,206 | 4/1960 | Alphin | 214—83.1 |
| 3,033,303 | 5/1962 | Weekly | 180—65 |

FOREIGN PATENTS 1,196,588   5/1959   France.

BENJAMIN HERSH, *Primary Examiner.*

A. HARRY LEVY, KENNETH H. BETTS, MILTON BUCHLER, *Examiners.*